(12) United States Patent  
Marchon et al.

(10) Patent No.: US 7,407,681 B2
(45) Date of Patent: Aug. 5, 2008

(54) PROCESS OF MAKING ROUND ITEMS OF FROZEN CONFECTIONERY

(75) Inventors: Jean-Michel Marchon, Beauvais (FR); Alain Daouse, Noailles (FR)

(73) Assignee: Nestec S.A., Vevey (CH)

( * ) Notice: Subject to any disclaimer, the term of this patent is extended or adjusted under 35 U.S.C. 154(b) by 393 days.

(21) Appl. No.: 11/137,739

(22) Filed: May 25, 2005

(65) Prior Publication Data

US 2005/0214416 A1  Sep. 29, 2005

Related U.S. Application Data

(62) Division of application No. 10/077,088, filed as application No. PCT/EP00/06448 on Jul. 6, 2000, now abandoned.

(51) Int. Cl.
  *A23G 9/04*  (2006.01)
  *A23G 9/28*  (2006.01)
  *A23G 9/44*  (2006.01)
(52) U.S. Cl. .......... 426/565; 426/516; 426/524
(58) Field of Classification Search .......... 426/524, 426/516, 565
See application file for complete search history.

(56) References Cited

U.S. PATENT DOCUMENTS 1,993,130 A   3/1935   Ballew
2,444,486 A   7/1948   Alheit
2,638,065 A   5/1953   Tarr
2,716,385 A   8/1955   Tarr
2,851,967 A   9/1958   Salerno
3,809,774 A * 5/1974   Raitt .................... 426/393
3,817,422 A   6/1974   Raitt
4,674,968 A   6/1987   Durst
4,752,197 A   6/1988   Getman
4,767,307 A   8/1988   Beer
4,925,689 A   5/1990   Getman
5,031,567 A   7/1991   Daouse
5,894,030 A * 4/1999   Gibson et al. .......... 426/524
6,025,003 A   2/2000   Jadraque et al.
6,598,516 B1* 7/2003   Gonon ................... 99/455

FOREIGN PATENT DOCUMENTS

EP  0 749 896    12/1996
GB  2 139 337    11/1984
JP  64-30541     2/1989

* cited by examiner

Primary Examiner—Arthur L Corbin
(74) Attorney, Agent, or Firm—Bell, Boyd & Lloyd LLP

(57) ABSTRACT

A round item of frozen confectionery having an even roundness and a shape generated by revolution but essentially lacking an apex, rough edges and forming tool marks, In particular, the frozen confectionery has the form of a ball similar in appearance to a ball made non-industrially with an ice-cream scoop. These items are manufactured by extrusion-forming of a confectionery in the cold state.

11 Claims, 2 Drawing Sheets

PROCESS OF MAKING ROUND ITEMS OF FROZEN CONFECTIONERY

CROSS-REFERENCE TO RELATED APPLICATIONS

Figure 1:
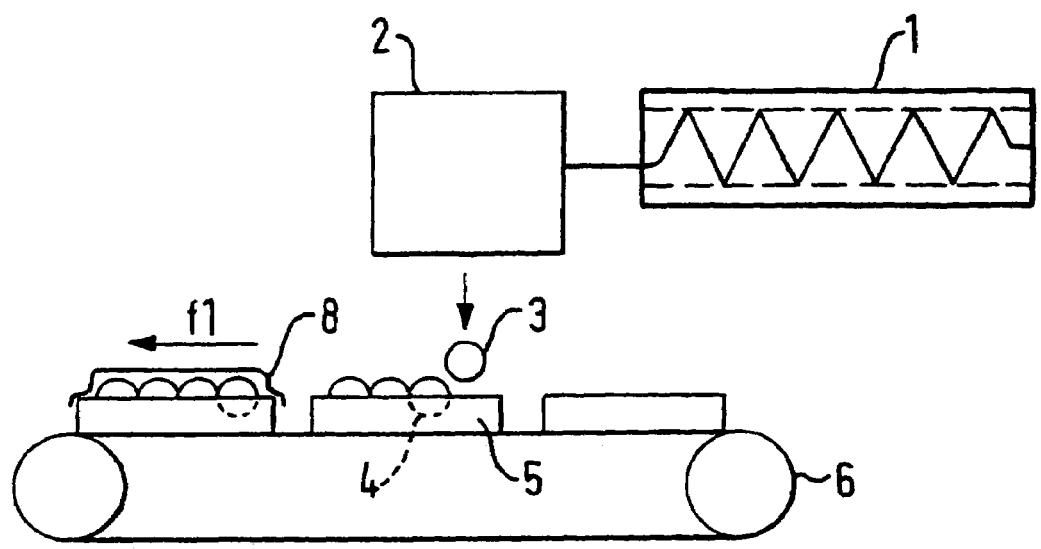

This application is a divisional of the U.S. patent application Ser No. 10/077,088 filed Feb. 15, 2002 now abandoned, which is a continuation of the U.S. national stage designation of International application PCT/EP00/06448, filed Jul. 6, 2000, the entire content of which is expressly incorporated herein by reference.

TECHNICAL FIELD

The invention relates to the field of simultaneous forming and proportioning of items consisting in forming and discharging in round-shaped portions a frozen confectionery having a pasty consistency.

The problem which forms the basis of the invention is the large-scale mechanical manufacture of round, especially spherical, items of frozen confectionery, for example ice-cream, ice-milk or sorbet, which do not contain a final coating of, for example, a couverture chocolate coating. Thus, when there is no coating capable of masking slight defects in shape, the formed portions obtained should have an evenly contoured roundness, a homogeneous general appearance and resemble, if possible, the shape and the appearance of balls produced manually with the aid of an ice-cream scoop, i.e., a degree of roughness in a surface which otherwise has an even, so to speak "handmade", roundness.

Preformed balls are not currently commercially available because attempts at forming these balls, e.g., by molding them in a two-part mold between two hemispherical cavities, have not provided the desired appearance, with the balls being too smooth at the surface and having a visible mold joint.

There is known, for example from U.S. Pat. No. 5,031,567, an apparatus for the continuous manufacture of ice-cream portions. This apparatus comprises the extrusion of a roll of pasty mass, the forming of the roll and its cutting into portions having a practically spherical shape by means of diaphragms, and the deposition of the cut portions onto a moving conveyor belt. After deposition, the portions pass successively into a hardening tunnel and into a coating machine where they are coated with a layer of chocolate. The balls provided by this device are not perfectly spherical. The ice-cream is relatively soft on leaving the extrusion nozzles, even if the freezer is pushed to the maximum of its refrigerating capacity. As a result, the ball is deformed under the effect of its own weight during the extrusion and tends to collapse when it falls upon the flat surface of the conveyor belt, resulting in a flat base before it has been sufficiently cooled by the hardening tunnel. Moreover, the mark by the diaphragm blades is clearly visible on its surface. Furthermore, there is a drop effect on the top by formation of a protuberance in the form of a tip when the ball is detached by the blades of the diaphragm. These marks are masked when the product is then coated, but the deformation of the items and the marks which are apparent on its surface are perceived as major visual defects for "plain" items that are utilized without a coating.

It is possible to improve the roundness of the products by accelerating the hardening phase, thus limiting the period during which the product can collapse on itself. This can be achieved by using a supercooled tunnel. Similarly, it is possible to cause the balls to fall into a liquid nitrogen bath in order to rapidly cool them and encrust the surface. Using such processes, it is effectively possible to improve the roundness of the products, but these processes are expensive and do not address the problem of the marks on the surfaces of the balls.

The present invention now overcomes the disadvantages of the known processes.

SUMMARY OF THE INVENTION

The invention relates to a round item of frozen confectionery having an even roundness and a cohesion of greater than 95%, but which essentially lacks an apex, rough edges and forming tool marks. Preferably, the frozen confectionery is an ice-cream, an ice-milk or a sorbet each having a percentage overrun of 80 to 120%. A variety of different shapes can be used where at least a portion of each one is rounded.

Another embodiment relates to a packaged frozen confectionery product comprising a plurality of round frozen confectionery items as described herein that are positioned upon cells in strips of thermoformed plastic material enclosed by an external packaging, such as a cardboard box.

The invention also relates to a process for the manufacture of round frozen confectionery items, which comprises extruding a frozen confectionery at a temperature of −7° C. at a constant pressure, and feeding a roll of the extruded frozen confection to a forming head at a rate which does not generate a countercurrent pressure upstream of the forming head. This process enables a round portion of the item to be formed which portion essentially lacks an apex, rough edges and forming tool marks. As noted above, a plurality of different shapes, each having at least one rounded portion, can be prepared by this process. As the rounded surface of the frozen confectionery item is smooth and defect-free, it can be sold as an uncoated product.

BRIEF DESCRIPTION OF THE DRAWING Figures

Figure 2:
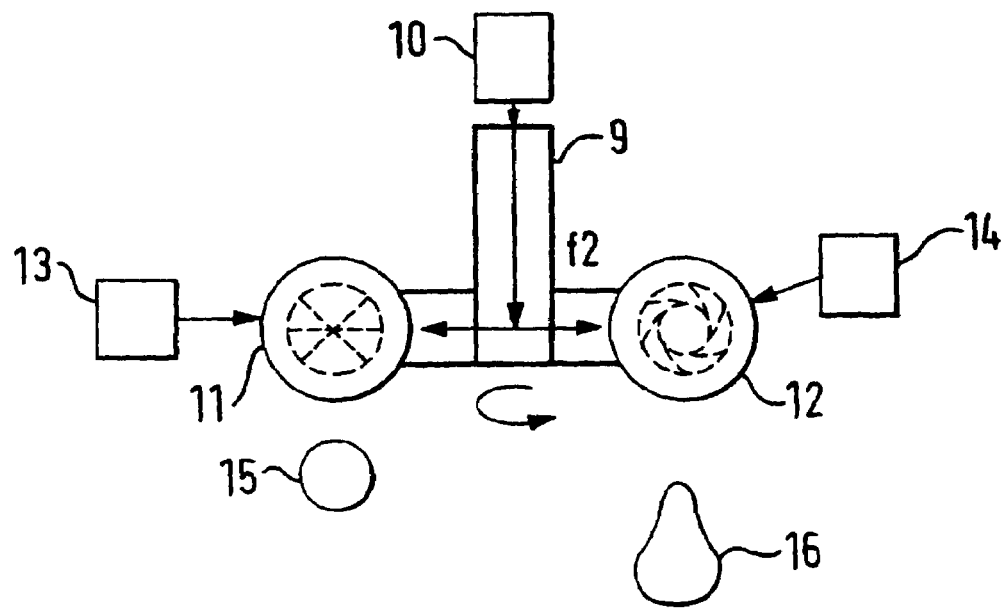
Figure 3:
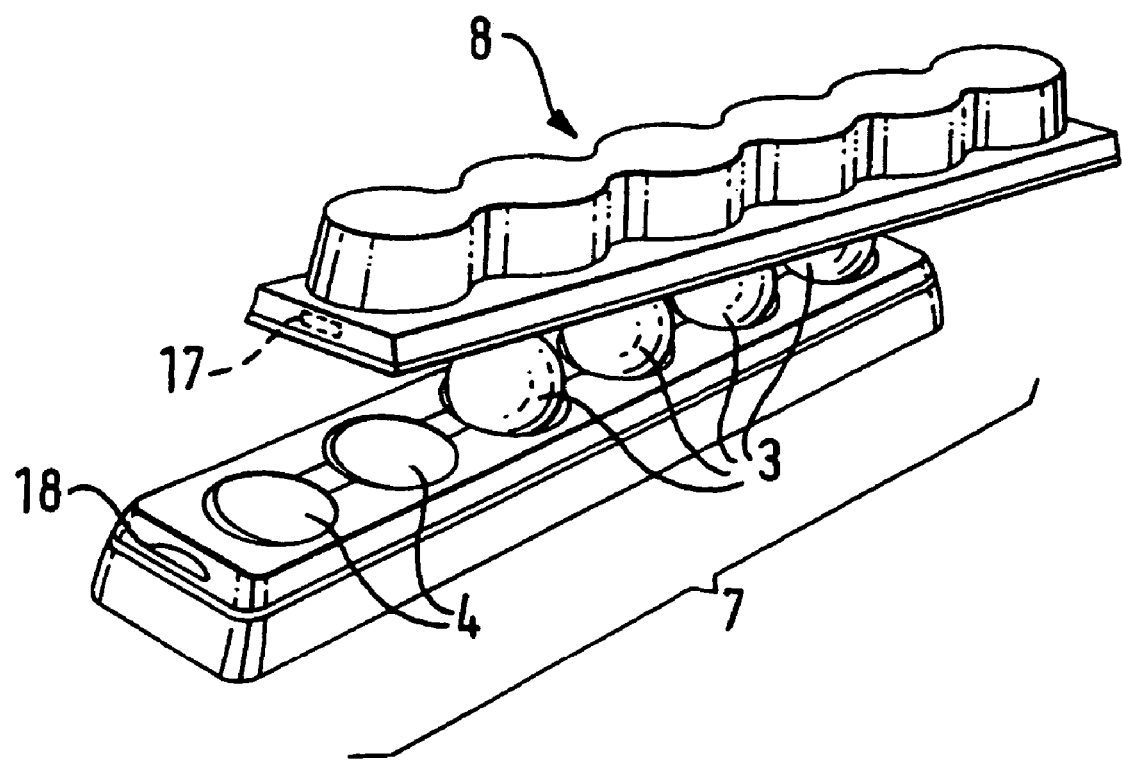

The accompanying drawings illustrate a preferred embodiment of the invention given by way of example. In these drawings, FIG. 1 is a schematic general view of the manufacturing process, FIG. 2 is a schematic detailed view of the means of driving the forming head, and FIG. 3 is an exploded perspective view of a packaging containing items.

DETAILED DESCRIPTION OF THE PREFERRED EMBODIMENTS

In the context of the invention, a frozen confectionery designates an ice-cream, an ice-milk or a sorbet having a percentage overrun of 80 to 120%, and excludes a water ice.

As noted above, the invention relates to a round item of frozen confectionery, preferably one obtained by extrusion-forming, that has an even roundness generated by revolution. It essentially lacks an apex, rough edges and forming tool marks, and has a good cohesion, preferably of greater than 95%. The cohesion is expressed as the percentage ratio between the height of the item just before hardening and that at the outlet of the extrusion nozzle. Thus, a cohesion greater than 95% according to the invention means that the deformation of the item does not exceed 5%.

"Good cohesion" means that the frozen confection should have a pasty and relatively hard consistency in order to be able to be formed continuously and at a high rate by extrusion-forming, and then be able to be deposited in a packaging moving below the forming device. These features are achieved without notable deformation of the volume or surface of the frozen confection during extrusion or during deposition into the packaging and up until the time of hardening.

Depending on the composition of the mix, the temperature on leaving the extruder, the capacity of the extruder and the throughput of the frozen confectionery, the frozen confectionery is generally at a temperature of −7° C. or less, and preferably is from −10° C. to −12° C. in the case of an ice-cream and −16° C. to −20° C. in the case of a ice-milk or a sorbet. Such frozen confectionery may be prepared by a cooled screw extruder, and preferably a twin screw extruder.

In the context of the invention, a round article can have any form of revolution, which is more or less complex. For example, the following shapes are suitable: a frustoconical shape having a circular base with a round top, a cylindrical shape having a round top, the shape of a skittle, the shape of a fruit, for example a pear, lemon or strawberry, and preferably the shape of a ball, a hollow sphere, or a hemisphere. The ball preferably has a diameter of 30 to 70 mm and preferably 30 to 40 mm, e.g., about 34 mm, for a volume of 14 to 180 ml and preferably of 14 to 25 ml, e.g., 20 to 25 ml.

The invention also relates to a process for the manufacture of a round item of frozen confectionery. This process comprises the steps of continuously feeding an extruded roll of frozen confectionery having a temperature of −7° C. or less at a constant pressure to a forming head with diaphragms, such that the frozen confectionery is directed alternately to one of the diaphragms. This avoids the creation of a counterpressure upstream of the forming head, so that round individual portions are formed and cut from the roll by the opening and closing of the diaphragms. The portions thus formed are directly deposited in a packaging moving below the forming head.

According to a preferred embodiment, the forming head consists of two diaphragms. The supply with frozen confectionery thus takes place alternately towards one or the other of the diaphragms. It is possible to allow for the diaphragms to be alternately supplied by a rotating cylindrical throttle chamber carrying out the distribution of the frozen confection, and for the blades constituting the diaphragms to be driven in a synchronized manner so that there is no counterpressure upstream. Therefore, no notable variation in the supply rate is encountered, due to the fact that when one of the diaphragms is completely open, the other is completely closed. Such a system is similar to that described for example in U.S. Pat. No. 5,031,567 or EP 0,373,246. The system for setting the cylindrical throttle chamber and the diaphragms in motion are mechanical, for example by a common motor with a variable speed drive unit engaged with the cylindrical throttle chamber and with cams driving the diaphragms synchronously.

The cylindrical throttle chamber and the diaphragms can be driven individually by servomotors, such that it is possible to continuously produce portions with forms of revolution which are different from each other.

After forming and cutting, the portions are deposited directly into cells arranged in lines and rows in packaging trays below the forming head, for example into trays made of thermoformed plastic material. The trays are carried by an indexed endless chain moving continuously and slowing down at the time of the deposition or discontinuously step by step, under the forming head, such that each portion is deposited into a cell. Preferably, each tray is closed with an additional cover covering the portions, for example locked onto the tray and preferably made of translucent thermoformed plastic material.

The formed portions are sufficiently hard at the time of forming so that their deformation by the dynamic extrusion operation is negligible. The deformation by the fall of the portions into the cells is low, generally on the order of a maximum of 3% for a distance between the diaphragm and the cells on the order of about 10 cm.

One decisive advantage of the present process is its high flexibility, its high productivity and its quality from the hygienic point of view, particularly, since the portions are deposited directly into their packaging without entering into contact with intermediate recovering surfaces.

Turning now to the drawings, FIG. 1 illustrates an ice-cream mix formed in a structure cooled by means of the twin screw extruder 1 to the outlet temperature of −14° C. The cold ice-cream has a percentage overrun of 90% by volume. An apparatus as described in U.S. Pat. No. 5,345,781 can be used as the extruder. As a variant, it is possible to use an extruder as described in U.S. Pat. No. 5,919,510 with an outlet temperature of −8° C. A cylindrical roll of hardened ice-cream is delivered at the outlet.

The roll is formed into balls by means of the forming head 2 containing diaphragms with six to eight blades. The blades of the diaphragms are curved inwards in order to obtain perfectly round balls 3. These balls 3 are deposited in the thermoformed cells 4 in the trays 5 made of plastic material, and are carried by the endless chain 6 moving according to the arrow f1, step by step. The trays are indexed on the output of the forming head 2. The trays 5 in fact consist of lines of stri1s 7 as represented in FIG. 3 below. Only one line of strips 7 has been represented in FIG. 1 for the sake of simplicity, but the forming head in reality delivers balls 3 in two lines. Once filled with balls, one strip is covered with a thermoformed cover 8 made e.g., of translucent plastic material locked onto the strip. The trays of strips are then directed to a hardening tunnel that is not shown.

The forming head is as represented in FIGS. 4 and 5 of U.S. Pat. No. 5,031,567 and EP 0,373,246 and the diaphragms and the cylindrical throttle chamber are synchronously driven as described in a first embodiment in this document.

In a second embodiment, starting with a forming head of the same construction as above and driven in a different manner as shown in FIG. 2, the cylindrical throttle chamber 9 is supplied with ice-cream according to f2 and its rotation according to f3 is directed by a servomotor 10 in order to distribute the ice-cream alternately according to f4 and f5 towards the diaphragms 11 and 12. A servomotor 13 operates the diaphragm 11 independently and a servomotor 14 operates the diaphragm 12, also independently, and the various servomotors are controlled by a programmable automatic machine so as to provide a constant flow of ice-cream without the formation of a counterpressure. Since the diaphragms 11 and 12 can be driven independently of each other, it is possible to produce portions of different shapes from the same forming head, for example a ball 15 and a pear 16. It is thus possible to vary the shapes of the portions from one strip to another or in the same strip.

In FIG. 3, the portions or balls 3 of ice-cream are arranged in the cells 4 in line in strips 7 made of thermoformed plastic material, each strip 7 containing, e.g., six balls 3. These strips 7 are covered with the cover 8 thermoformed from a translucent plastic material. The cover 8 is locked onto the strip 7 in a known manner, for example by means of a member such as a resilient tongue 17 or flap located inside each end face of the cover 8 and which fits into a complementary recess 18 outside each corresponding end face of the strip 7. It is possible to have for example three strips 7 in parallel lines, respectively containing balls of chocolate-, vanilla- and praline-flavored ice-cream or respectively vanilla-flavored balls with red fruits and with lemon, placed in a cardboard outer packaging case or box which is not shown. In this case, it is clear that for placing in boxes, it is necessary to allow for the separation of the lines of strips, and then their convergence into three lines, which may be produced by mechanical devices in a known manner.

In the embodiment represented, the items represented are balls. It is possible to change the shape of the items by modifying the opening and closing rhythm of the diaphragms. It is also possible to act on the curvature and the cutting edge of the blades of the diaphragms in order to modify the roundness of the items. The blades may also be notched so as to produce decorative effects on the surface.

In the embodiment represented, the head comprises two diaphragms. Without departing from the scope of the invention, it is possible to increase the number of diaphragms. It is also possible to replace a single conduit for supplying the roll with a conduit comprising separating walls or with a coaxial conduit with a smaller diameter supplying several different frozen confectionery products, so as to produce items with two or more flavors by coextrusion.

What is claimed is:

1. A process for the manufacture of round frozen confectionery items, which comprises:
   extruding a frozen confectionery at a temperature of −7° C. or less at a constant pressure;
   feeding a roll of the extruded frozen confection to a forming head at a rate which does not generate a countercurrent pressure upstream of the forming head, and which allows a round, smooth portion of the frozen confectionery item to be formed without the presence of an apex, rough edges and forming tool marks.

2. The process of claim 1, wherein the forming head includes at least two diaphragms for forming the round portions of the frozen confectionery items, and the roll feeding comprises:
   feeding the roll of the extruded frozen confectionery to a first diaphragm to form the round portion of a first item;
   diverting the roll to a second diaphragm before a countercurrent pressure is generated upstream of the first diaphragm;
   forming a round portion of a second item in the second diaphragm;
   diverting the roll back to the first diaphragm before a countercurrent pressure is generated upstream of the second diaphragm; and
   repeating these steps until the desired number of frozen confectionery items are formed.

3. The process of claim 2, wherein each diaphragm includes 6 to 8 blades and which further comprises cutting the formed items by opening and closing the diaphragms.

4. The process of claim 3, which further comprises directly depositing the cut frozen confectionery item on a packaging material that is moving past the forming head.

5. The process of claim 2, wherein the diverting of the roll is effected by a rotating cylindrical throttle chamber that distributes it to the diaphragms, and the diaphragms are driven in a synchronized manner so that there is no counterpressure upstream and therefore no notable variation in the supply rate by the fact that when one of the diaphragms is completely open, the other is completely closed.

6. The process of claim 5, in which the cylindrical throttle chamber and the diaphragms can be driven individually by servomotors, such that it is possible to continuously produce frozen confectionery items with forms of revolution which are different from each other.

7. The process of claim 1, wherein the extrusion temperature is between −10° C. to −12° C. and the frozen confectionery is an ice-cream having a cohesion of greater than 95% and a percentage overrun of 80 to 120%.

8. The process of claim 1, wherein the temperature is between −16° C. to −20° C. and the frozen confectionery is an ice-milk or a sorbet having a cohesion of greater than 95% and a percentage overrun of 80 to 120%.

9. The process of claim 1, which further comprises forming a plurality of frozen confectionery items, placing the items in line in cells on strips of thermoformed plastic material, and packaging the strips in external packagings.

10. The process of claim 9, wherein the external packagings are cardboard boxes.

11. The process of claim 9, in which the strips are closed with an additional that covers the frozen confectionery items, wherein the covers are locked onto the strips and are made of translucent thermoformed plastic material.

* * * * *